United States Patent
Woodward et al.

(10) Patent No.: US 11,621,780 B2
(45) Date of Patent: Apr. 4, 2023

(54) EMITTER, COMMUNICATION SYSTEM AND METHOD

(71) Applicant: Kabushiki Kaisha Toshiba, Tokyo (JP)

(72) Inventors: Robert Ian Woodward, Cambridge (GB); Zhiliang Yuan, Cambridge (GB); Andrew James Shields, Cambridge (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 17/652,562

(22) Filed: Feb. 25, 2022

(65) Prior Publication Data

US 2022/0407605 A1   Dec. 22, 2022

(30) Foreign Application Priority Data

May 28, 2021  (GB) ...................... 2107712

(51) Int. Cl.
*H04B 10/00*  (2013.01)
*H04B 10/50*  (2013.01)
*H04B 10/70*  (2013.01)
*H04J 14/00*  (2006.01)

(52) U.S. Cl.
CPC .......... *H04B 10/503* (2013.01); *H04B 10/70* (2013.01)

(58) Field of Classification Search
CPC .... H04B 10/516; H04B 10/532; H04B 10/54; H04B 10/541; H04B 10/548; H04B 10/556; H04B 10/5561; H04B 10/70
See application file for complete search history.

(56) References Cited

U.S. PATENT DOCUMENTS

2003/0161638 A1* 8/2003 Fujiwara ............. H04B 10/532
                                                                  398/186
2005/0047601 A1   3/2005 Shields et al.
(Continued)

FOREIGN PATENT DOCUMENTS

| CN | 106254065 B | 8/2019 |
|---|---|---|
| GB | 2529228 A | 2/2016 |
| GB | 2537821 B | 4/2017 |
| GB | 2529228 B | 8/2017 |

(Continued)

OTHER PUBLICATIONS

British Combined Search and Examination Report dated Nov. 17, 2021 in GB 2107708.6 filed on May 28, 2021, 7 pages.

(Continued)

*Primary Examiner* — Daniel G Dobson
(74) *Attorney, Agent, or Firm* — Oblon, McClelland, Maier & Neustadt, L.L.P.

(57) ABSTRACT

An emitter configured to output a sequence of periodic light pulses with different polarisations, the emitter comprising:
  a beam splitter configured to divide the pulses of a first sequence of pulses, such that each pulse is split between a first path and a second path, the first sequence of pulses having a varying phase and a first polarisation;
  a polarisation rotator configured to rotate the polarisation state of pulses in one of the first path or the second path with respect to the polarisation state of pulses in the other path;
  a time delay component configured to provide a time delay such that the first sequence of pulses in the first arm are delayed by one period with respect to the first sequence of pulses in the second arm;
  an optical combination component configured to combine the delayed first sequence of pulses from the first path with the first sequence of pulses from the second path to produce an output sequence of pulses where each pulse in the output sequence is a combination of a pulse from the second path and a delayed pulse from the first path and has a polarisation determined from the phase difference between combined pulses and the polarisation of the first path and the second path.

20 Claims, 5 Drawing Sheets

(56) References Cited

U.S. PATENT DOCUMENTS

2017/0237505 A1* 8/2017 Lucamarini .......... H04L 9/0858
   398/185
2020/0336211 A1   10/2020 Zhang et al.

FOREIGN PATENT DOCUMENTS

GB         2573218 A      10/2019
WO   WO 2016/142701 A1    9/2016

OTHER PUBLICATIONS

Yuan et al., "Directly Phase-Modulated Light Source", Physical Review X, 6, 031044, 2016, 8 pages.
Gruenenfelder et al., "Performance and security of 5 GHz repetition rate polarization-based quantum key distribution", Applied Physics Letters 117, 144003, 2020, 5 pages.
Nauerth et al., "Information leakage via side channels in freespace BB84 quantum cryptography", New Journal of Physics 11, 065001, 2009, 9 pages.
Vest et al., "Design and Evaluation of a Handheld Quantum Key Distribution Sender module," IEEE Journal of Selected Topics in Quantum Electronics, vol. 21, No. 3, 2015, 7 pages.
Pugh et al., "Airborne demonstration of a quantum key distribution receiver payload," Quantum Science and Technology 2, 024009, 2017, 11 pages.
Pugh et al., "Airborne demonstration of a quantum key distribution receiver payload", arXiv:1612.06396v2, 2017, 16 pages.
Combined United Kingdom Office Action and Search Report dated Mar. 2, 2022 in United Kingdom Patent Application No. 2107712.8, 11 pages.

\* cited by examiner

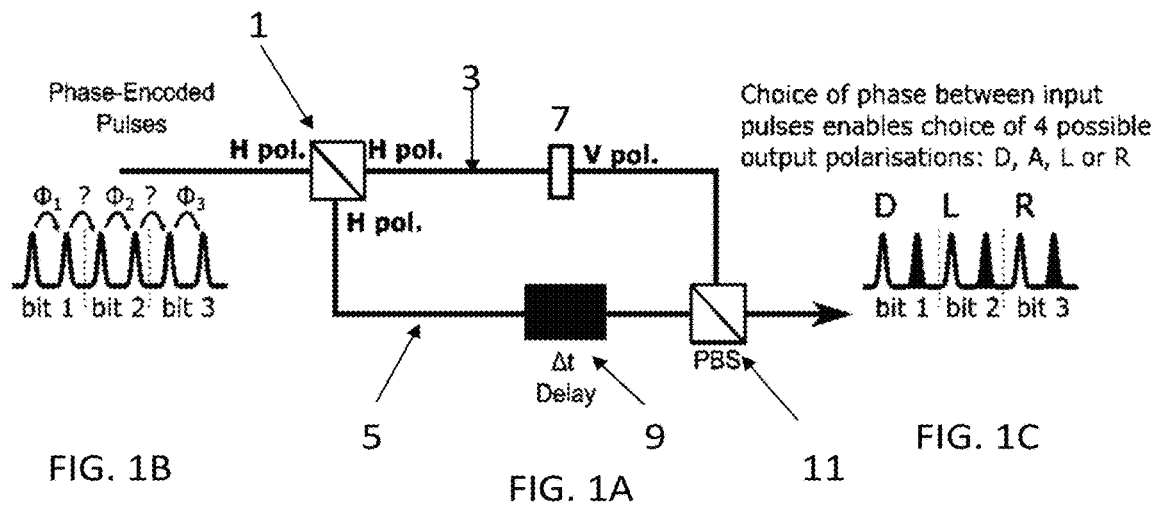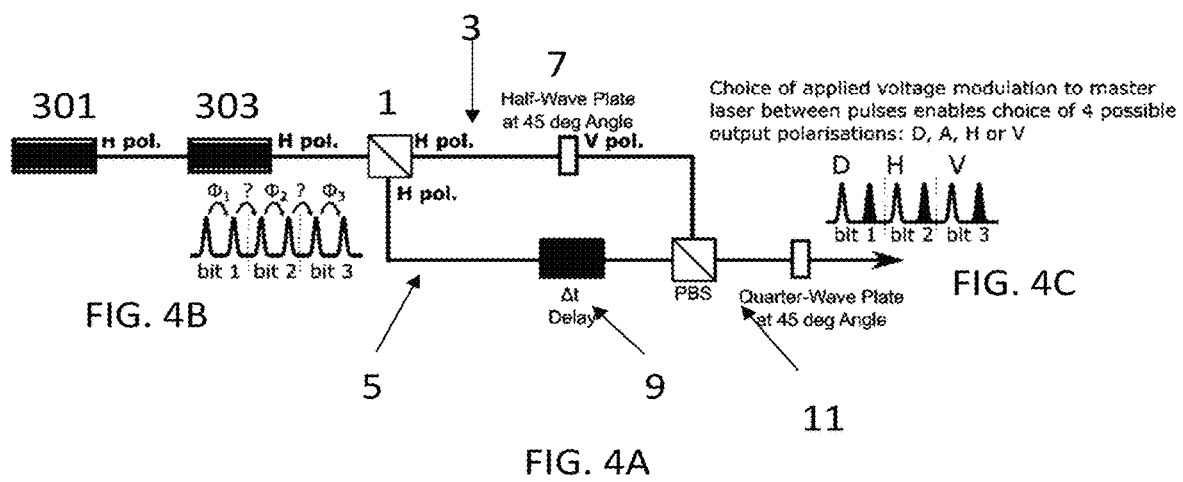

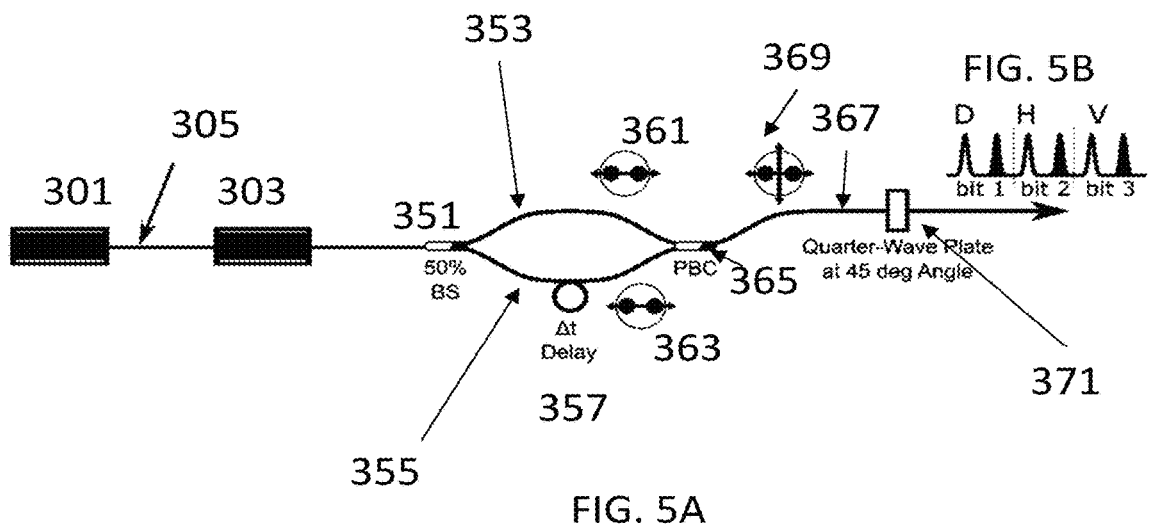
FIG. 5A
FIG. 5B
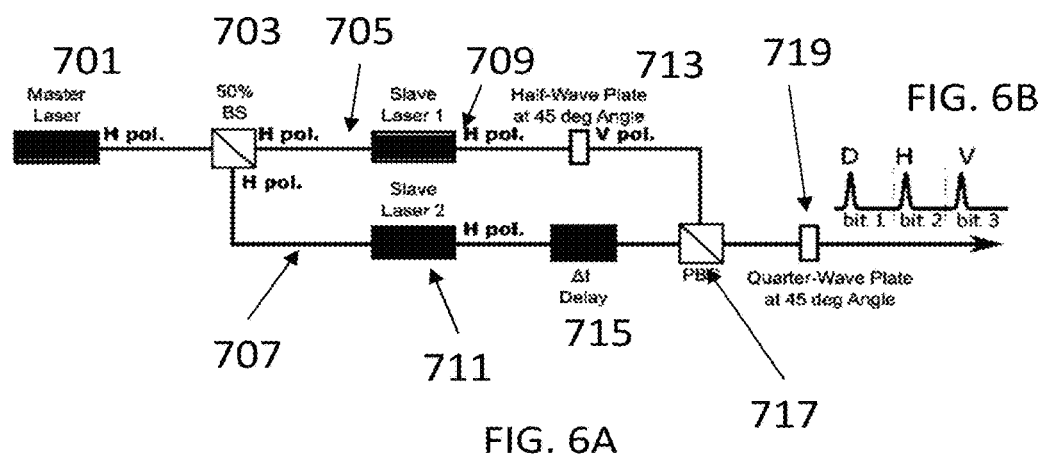
FIG. 6A
FIG. 6B

EMITTER, COMMUNICATION SYSTEM AND METHOD

CROSS REFERENCE TO RELATED APPLICATION

This application claims the benefit of United Kingdom Application number 2107712.8 filed on 28 May 2021, which is hereby incorporated by reference.

FIELD

Embodiments described herein relate to an optical emitter, communication system and method.

BACKGROUND

In a quantum communication system, information is sent between a transmitter and a receiver by encoded single quanta, such as single photons. Each photon carries one bit of information which can be encoded upon a property of the photon, such as its polarization.

Quantum key distribution (QKD) is a technique which results in the sharing of cryptographic keys between two parties: a transmitter often referred to as "Alice"; and a receiver often referred to as "Bob". The attraction of this technique is that it provides a test of whether any part of the key can be known to an unauthorised eavesdropper, often referred to as "Eve". In many forms of quantum key distribution, Alice and Bob use two or more non-orthogonal bases in which to encode the bit values. The laws of quantum mechanics dictate that measurement of the photons by Eve without prior knowledge of the encoding basis of each causes an unavoidable change to the state of some of the photons. These changes to the states of the photons will cause errors in the bit values sent between Alice and Bob. By comparing a part of their common bit string, Alice and Bob can thus determine if Eve has gained information.

BRIEF DESCRIPTION OF THE FIGURES

FIG. 1A is a schematic of an emitter in accordance with an embodiment, FIG. 1B is a schematic of a pulse train for input into the emitter of FIG. 1A and FIG. 1C is a schematic of a pulse train output by the emitter of FIG. 1A;

FIG. 4A is a schematic of an emitter in accordance with an embodiment having a primary and secondary gain switched laser, FIG. 4B is a schematic of a pulse train for input into the emitter of FIG. 4A and FIG. 4C is a schematic of a pulse train output by the emitter of FIG. 4A;

FIG. 5A is a schematic of an emitter in accordance with an embodiment which is fibre based and FIG. 5B is a schematic of a pulse train output by the emitter of FIG. 5A;

FIG. 6A is a schematic of an emitter in accordance with an embodiment where a secondary laser is provided in each arm of the emitter and FIG. 6B is a schematic of a pulse train output by the emitter of FIG. 6A.

DETAILED DESCRIPTION OF THE FIGURES

Figure 2A:
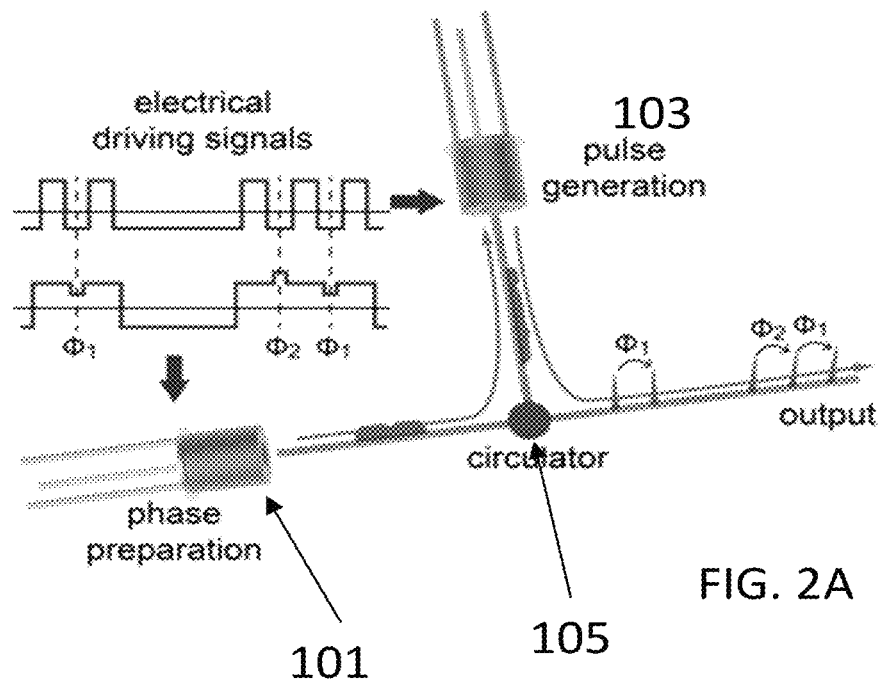
FIG. 2A is a schematic of a primary and secondary laser arrangement.

In an embodiment, an emitter is provided, configured to output a sequence of periodic light pulses with different polarisations, the emitter comprising:
  a beam splitter configured to divide the pulses of a first sequence of pulses, such that each pulse is split between a first path and a second path, the first sequence of pulses having a varying phase and a first polarisation;
  a polarisation rotator configured to rotate the polarisation state of pulses in one of the first path or the second path with respect to the polarisation state of pulses in the other path;
  a time delay component configured to provide a time delay such that the first sequence of pulses in the first arm are delayed by one period with respect to the first sequence of pulses in the second arm;
  an optical combination component configured to combine the delayed first sequence of pulses from the first path with the first sequence of pulses from the second path to produce an output sequence of pulses where each pulse in the output sequence is a combination of a pulse from the second path and a delayed pulse from the first path and has a polarisation determined from the phase difference between combined pulses and the polarisation of the first path and the second path.

The above emitter uses the interference of pulses with different fixed polarisations and phases to produce a stream of pulses with different polarisations. The polarisation of the pulses can be controlled by controlling the phase difference between pairs of input pulses. Thus, it is possible to output a stream of pulses with varying polarisation without the use of a polarisation modulator or the like to actively set the polarisation of each pulse. The emitter converts a sequence of pulses encoded in phase and outputs a corresponding sequence of pulses encoded in polarisation. The polarisation rotator provide in one path is a fixed polarisation rotator and is not modulated for each pulse.

In an embodiment, the emitter comprises a first source configured to generate the first sequence of pulses of light having a varying phase and a first polarisation.

The above has may uses, the generation of optical pulses with encoded information at high clock rates is a key building block for optical communications. The state of polarisation of light is one of the most common optical properties which can be modulated to encode information (e.g. polarisation shift keying). For practical communication system applications, optical transmitters should be simple, compact, low cost, and have low power consumption. The above embodiment simplifies the state of the art in this area and thus could be used in numerous communication areas.

Also, polarisation-modulated laser sources are required for various sensing and imaging applications, where a sample's response to light is measured as a function of polarisation in order to infer information about its structure or properties (e.g. polarization modulation-infrared reflection-absorption spectroscopy, PM-IRRAS)

The above emitters can be used in many QKD systems. For example, the above can be used in polarisation-encoding quantum key distribution (QKD) and polarisation-encoding measurement device independent quantum key distribution (MDI QKD) devices. Polarisation encoding is particularly important for free-space QKD applications, such as Satellite QKD. In QKD, the emitter may further comprise an attenuator configured to attenuate the pulses leaving the emitter to comprise on average no more than one photon.

In quantum communication, polarisation encoding can be used to encode information on weak light pulses. Some encoding protocols require pulses to be prepared in one of two encoding basis and where there are two orthogonal states in each basis. This can be achieved by the above emitter.

The emitter may further comprise a controller for said first source wherein said controller is configured to cause said first source to output pulses where pairs of pulses have a phase difference that allows one of a set number of phase differences to be randomly selected. For example, the controller may be configured to switch the phase differences between pairs of pulses between four different values that correspond to two basis and two orthogonal states within each basis. For example, the emitter may comprise a controller for said first source and said controller is configured to cause said first source to output pairs of pulses having a set phase difference randomly selected from one of 0, $\pi/2$, $-\pi/2$ and $\pi$.

In an embodiment, the controller is configured to cause said first source to output pairs of pulses with said set phase difference and for a random phase difference to be provided between the last pulse of one pair and the first pulse of the following pair.

In an embodiment, the first source is a gain switched laser and said controller is configured to modify the gain applied to the first source. By modifying the gain applied to the first source, it is possible to control the output of the phase of the pulses output by the laser. A pulse output from the first source can be used as a seeding pulse to a secondary laser. The secondary gain switched laser will then output a pulse with a phase related to that of the seeding pulse, but with reduced jitter.

In one embodiment, the secondary laser is provided prior to said beam splitter such that the sequence of pulses output by the secondary laser is divided by said beam splitter.

In a further embodiment, the secondary laser is provided by a first gain switched secondary laser and a second gain switched secondary laser, wherein the first secondary laser is provided in the first path and the second secondary laser is provided in the second path. In this arrangement, a secondary laser controller may be provided to control the first secondary laser not to emit a pulse when it receives the second pulse of a pair of pulses with the set phase difference and to control the second secondary laser not to emit a pulse when it receives the first pulse of the pair of pulses with the set phase difference.

In an embodiment, the polarisation rotator is configured to rotate the polarisation state of pulses in one of the first path or the second path with respect to the polarisation state of pulses such that pulses in one path have an orthogonal polarisation to the pulses in the other path.

In a further embodiment, the first path and second path comprise polarisation maintaining optical fibre and the polarisation rotator is provided by rotating the fibre birefringent axis in one path. Such an arrangement allows the optical combination component to be a polarising beam splitter.

The optical combination component will output pulses with a polarisation determined by the phase difference. It may be desired to apply a fixed rotation to all of the pulses output in order to, for example, transform the output polarisations to new polarisation basis. Therefore, the emitter may further comprise a waveplate provided to rotate the polarisation of the output sequence of pulses.

As noted above, the emitter can be used in Quantum Key Distribution (QKD). For such a use, the emitter may be configured to output pulses randomly selected from two polarisation basis. For example, this might be achieved by configuring the emitter to output one of four states, said four states selected from two orthogonal states in each polarisation basis.

In the embodiments that comprise a gain switched laser, the switching between the polarisation states can be achieved by switching the gain of the laser. The gain of the laser can be controlled to allow the phase difference between output pulses in a pair of output pulses to be randomly selected from one of four values. The four values are selected such that the interference between the pulses allows the desired polarisation states to be output from the emitter.

In a further embodiment, a communication system is provided, comprising the above emitter and a receiver, said receiver being configured to receive pulses from said emitter and measure said pulses in a first or a second polarisation basis. For example, said receiver may comprise a polarisation splitter which is configured to be actively or passively switched between said first and second polarisation basis and at least one detector configured to measure the output of said polarisation splitter.

In a further embodiment, a method of emitting a sequence of periodic light pulses with different polarisations is provided, the method comprising:

receiving a first sequence of pulses of light having a varying phase and a first polarisation, dividing the pulses of the first sequence, such that the pulse from each beam is split between a first path and a second path, rotating the polarisation state of pulses in one of the first path or the second path with respect to the polarisation state of pulses in the other path;

delaying in time the first sequence of pulses in the first arm by one period with respect to the first sequence of pulses in the second arm;

combining the delayed first sequence of pulses from the first path with the first sequence of pulses from the second path to produce an output sequence of pulses where each pulse in the output sequence is a combination of a pulse from the second path and a delayed pulse from the first path and has a polarisation determined from the phase difference between combined pulses and the polarisation of the first path and the second path.

In a further embodiment, a quantum communication method is provided, the method comprising:

emitting a sequence of periodic light pulses with different polarisations according to the method of described above, wherein pulses in the sequence of periodic light pulses with different polarisations, comprise polarisations randomly selected from two polarisation basis; and receiving at a receiver the sequence of periodic light pulses with different polarisations and varying the polarisation measurement basis in the receiver.

FIG. 1A shows an emitter in accordance with an embodiment, the input to the emitter is a sequence of phase encoded pulses which will be referred to as a "first" pulse sequence. The first pulse sequence is shown in more detail in FIG. 1B.

The first pulse sequence can be viewed as a series of pairs of pulses. Each pair of pulses corresponds to a bit which is encoded in the phase difference, $\Phi_1$, $\Phi_2$, $\Phi_3$, between the pulses of each pair of pulses. The phase difference between the later pulse of one pair and the earlier pulse of the following pair in time should be random which is shown as "?" in the figure. In this embodiment, the polarisation of this first pulse sequence is horizontal. However, other polarisations are possible. In this embodiment, all pulses have the same polarisation, this fixed polarisation can be produced by a source that generates the first pulse sequence or it can be produced by a further component in the system.

The reasons for this and how the pulse differences are selected between the pulses in each pair will be described in more detail later in this description. The first pulse sequence first impinges on 50:50 beam splitter 1. Beam splitter 1 is not a polarising beam splitter and it is configured to split each pulse so that 50% of the pulse follows first path 3 and 50% of the pulse follows the second path 5.

In the first path 3, there is a polarisation rotator 7 which rotates the polarisation in the first path by 90° so that the pulses that follow the first path 3 are in a non-orthogonal polarisation state to the pulses in the second path 5. In this example, the polarisation rotator 7 is provided by half-wave plate at a 45° angle. However, it is possible for other types of polarisation rotators to be used or for the polarisation rotation to be implemented via a fibre-based system.

Although in FIG. 1A, the polarisation rotator 7 is provided in the first path 3, it could equally as easily be provided in the second path. The polarisation rotator is provided to allow the first sequence of pulses in the first path 3 have an orthogonal polarisation to the first sequence of pulses in the second path 5.

In the second path 5, a time delay unit 9 is provided. The time delay unit 9 may be implemented by a delay line or the like. In this example, the time delay unit 9 is provided in the second path 5. However, it could alternatively be provided in the first path 3. The time delay unit 9 functions to delay the earlier (or first) pulse of a pair of pulses to allow it to be combined with the later (or second) pulse in the pair which has followed the other path.

The pulses from the first path 3 and the second path 5 are then combined at a polarising beam splitter 11. The polarising beam splitter allows the delayed earlier pulse of a pair of pulses from the second path 5 to overlap with the non-delayed later pulse of the same pair of pulses which followed the first path 3.

Also, due to the continuous stream of pulses in the first pulse sequence shown in FIG. 1B, the delayed later pulse of a pair of pulses will also overlap with the non-delayed first pulse of the following pair of pulses. However, this pulse contains no useful information and will be discarded. FIG. 1C shows an output sequence of pulses where the black pulses indicate the pulses to be discarded and the white pulses indicate those which have been encoded in polarisation.

To understand how the phase difference between pairs of pulses in the first pulse sequence is used to generate a pulse sequences encoded in polarisation, the basics of polarisation will be described below.

The electric field associated with light can be described as two perpendicular oscillating waves, which can have different amplitudes and a phase delay between them. These waves propagate together, defining the overall direction of the electric field which is known as the state of polarisation of light.

Information can be encoded by modulating the optical polarisation state. In this embodiment, states are chosen from the following polarisation bases which comprise two orthogonal basis states:

Rectilinear Linear Polarisation—with basis states H (horizontal polarisation, i.e. 0 deg angle of orientation) and V (vertical polarisation, i.e. 90 deg angle of orientation)

Diagonal Linear Polarisation—with basis states D (diagonal polarisation, i.e. 45 deg angle of orientation, which is equivalent to considering light as comprising 50% of light in horizontal and 50% in the vertical direction, with 0 phase delay between them) and A (anti-diagonal polarisation, i.e. −45 deg angle of orientation, which is equivalent to considering light as comprising 50% of light in horizontal and 50% in the vertical direction, with $\pi$ phase delay between them)

Circular Polarisation—with basis states L (left circular polarized, i.e. 45 deg angle of orientation, which is equivalent to considering light as comprising 50% of light in horizontal and 50% in the vertical direction, with $\pi/2$ phase delay between them) and R (right circular polarized, i.e. 45 deg angle of orientation, which is equivalent to considering light as comprising 50% of light in horizontal and 50% in the vertical direction, with $-\pi/2$ phase delay between them)

These polarisation basis states expressed as Jones vectors are:

$$H = \begin{pmatrix} 1 \\ 0 \end{pmatrix} \quad V = \begin{pmatrix} 0 \\ 1 \end{pmatrix}$$

$$D = \frac{1}{\sqrt{2}} \begin{pmatrix} 1 \\ 1 \end{pmatrix} \quad A = \frac{1}{\sqrt{2}} \begin{pmatrix} 1 \\ -1 \end{pmatrix}$$

$$L = \frac{1}{\sqrt{2}} \begin{pmatrix} 1 \\ i \end{pmatrix} \quad R = \begin{pmatrix} 1 \\ -i \end{pmatrix}$$

where $i = \sqrt{-1}$.

FIGS. 1A, 1B and 1C show a system that allows the first pulse sequence of FIG. 1A, which comprises phase-modulated time-bin bits, to be converted to a polarisation-modulated bit sequence of FIG. 1C.

As described above, each phase-modulated time-bin bit input from the first pulse sequence comprises a sequence of pulse pairs. Each pair comprises an "early" and a "late" pulse, where the bit value is encoded in the phase, <D, between them.

For quantum communication, this bit's wavefunction can be written as:

$$\psi = |E\rangle + e^{j\Phi}|L\rangle$$

where |E> and |L> indicate the early and late time bin state of each pair. The global phase between each pair of pulses can be phase randomized to satisfy security requirements for quantum key distribution (QKD) applications (shown as a '?' in FIG. 1A).

The output pulse sequence of FIG. 1C will be at the same repetition rate as the first pulse sequence of FIG. 1A. However, for the pairs of pulses in the output pulse sequence of FIG. C, the earlier pulse of each pair will be polarisation randomized. This is due to the random phase between input bits, resulting in random phase delays and thus random output polarisation.

These polarisation-randomised pulses are not used to encode information (but can be used as a security feature in QKD, explained later). The later pulse in each output pair, however, has a polarisation state which directly depends on the Φ value between the input pulses—directly mapping phase encoding to polarisation encoding.

How the scheme alters the polarisation state of light will now be described with reference to Jones calculus. The input is assumed to be a fixed linear horizontal polarisation state. The first path 3 and the second path 5 in FIG. 1B form a structure similar to an asymmetric Interferometer.

Before the pulses in the first path and the second path recombine at the polarizing beam splitter 11, the Jones vector at the time of early & late bins for a single bit being interfered can be written as follow:

$$\text{First path, Just Before } PBS = \begin{pmatrix} |E\rangle \\ 0 \end{pmatrix}$$

$$\text{Second path, Just Before } PBS = \begin{pmatrix} 0 \\ e^{j\Phi}|L\rangle \end{pmatrix}$$

The polarizing beam splitter 11, transmits horizontally polarized light and reflects vertically polarized light. Therefore, at one of the polarizing beam splitter 11, output ports, the optical polarisation state is:

$$\text{Output} = \begin{pmatrix} |E\rangle \\ e^{j\Phi}|L\rangle \end{pmatrix}$$

In an embodiment, the early and late pulses are of equal amplitude and this allows the normalised output polarisation state to be written as:

$$\text{Output} = \frac{1}{\sqrt{2}} \begin{pmatrix} 1 \\ e^{j\Phi} \end{pmatrix}$$

This shows that the apparatus of FIG. 1A, can be used to generate basis vectors in the diagonal and circular polarisation bases simply by choosing the input phase Φ:

| Phase Between Early & Late Time Bins | Pulse Polarisation at System Output |
|---|---|
| 0 | $\frac{1}{\sqrt{2}}\begin{pmatrix}1\\1\end{pmatrix} = D$ |
| π | $\frac{1}{\sqrt{2}}\begin{pmatrix}1\\-1\end{pmatrix} = A$ |
| π/2 | $\frac{1}{\sqrt{2}}\begin{pmatrix}1\\j\end{pmatrix} = L$ |
| −π/2 | $\frac{1}{\sqrt{2}}\begin{pmatrix}1\\-j\end{pmatrix} = R$ |

It should be noted that the above is an example and any input polarisation state is possible—H is used simply as an illustration. Similarly, the output bases that are generated can be altered by applying a simple unitary rotation. For example, adding a quarter wave-plate component at the output, oriented at 45 degrees, will convert basis vectors in the circular basis (L/R) to the rectilinear basis (H/V), while leaving the diagonal basis (D/A) vectors unchanged.

Any type of source and/or source with extra components can be used to produce the first pulse sequence of FIG. 1A.

FIGS. 2A to 2D and FIGS. 3A and 3B are used to explain a specific type of source which allows the formation of an ultra-compact and high-performance QKD transmitters. This source, shown in FIG. 2A has directly phase modulated pulses using gain-switching and optical injection locking and does not need external phase modulators.

The source comprises a pulsed secondary laser 103 into which a pulse from a primary laser 103 is injected to define the phase between the secondary laser's output pulses, based on optical injection locking. The primary laser 101 performs the task of phase preparation whereas the secondary laser 103 performs the task of pulse preparation. The description of FIGS. 2A to 2D focusses more on the control of the primary laser. The description of FIGS. 3A and 3B focusses more on the secondary laser and the combination of the two lasers.

As schematically depicted in FIG. 2A, a primary laser diode 101 is connected to a secondary laser diode 103 via an optical circulator 105. It should be noted that the primary 101 and secondary 103 laser diodes may be identical, the terms "primary" and "secondary" are used merely for clarity and do not imply any physical differences between the primary 101 and secondary 103 laser diodes.

The primary laser 101 is used for phase-preparation is directly modulated to produce long pulses from quasi-steady-state emission. Each of these pulses coherently seeds a block of two or more secondary, short optical pulses emitted by gain switching the secondary or pulse-generation laser 103. The phase-preparation laser 101 is biased to produce nanosecond scale or even less, quasi-steady-state optical pulses with shallow intensity modulation, which also modifies the optical phase. For clock rates greater than 1 GHz, the pulse width is less than 1 ns. The gain-switched pulse-generation laser 103 emits short optical pulses which inherit the optical phase prepared by the phase-preparation laser. The duration of each phase-preparation laser pulse can be varied to seed a pulse train of different lengths.

The relative phase between the secondary pulses depends on the phase evolution of the primary pulses and can be set to an arbitrary value by directly modulating the driving current applied to the primary or phase-preparation laser 101.

For example, a relative phase 41 between two secondary pulses can be obtained by introducing a small perturbation in the driving signal of the phase-preparation laser FIG. 2A. Similarly, the relative phases between three secondary pulses can be set to $\phi_1$ and $\phi_2$ by adding two small perturbations to the driving signal of the primary laser 101.

In principle, such perturbations in the driving signal would cause detrimental fluctuations in the intensity and frequency of the primary pulses. However, these can be avoided by switching the secondary laser's 103 gain off in correspondence with the perturbation signals. Effectively, the secondary laser 103 also acts as a filter rejecting residual modulations.

To understand how an optical phase is set by perturbing the driving signal applied to the phase-preparation laser, it is useful to consider a continuous wave laser above threshold emitting at the central frequency $\upsilon_0$.

Figure 2B:
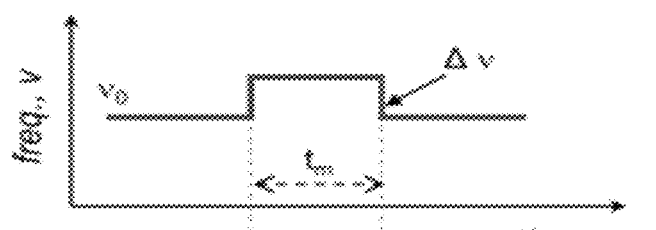
FIG. 2B is a plot of the optical frequency of the primary laser under a small perturbation of the control gain of duration $t_m$.
Figure 2C:
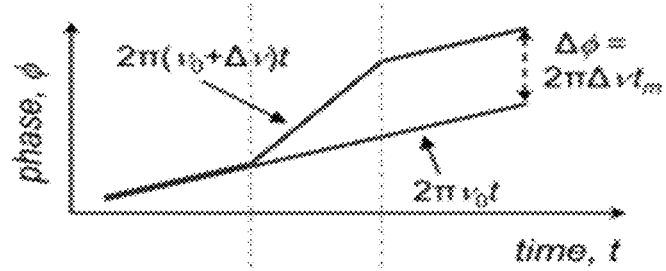
FIG. 2C is a plot of optical phase trajectories with and without the perturbation of the primary laser.

FIG. 2B is a plot of the optical frequency of the phase-preparation laser under a small perturbation of duration $t_m$. FIG. 2C is a plot of optical phase trajectories with and without the perturbation of the phase-preparation laser.

Figure 2D:
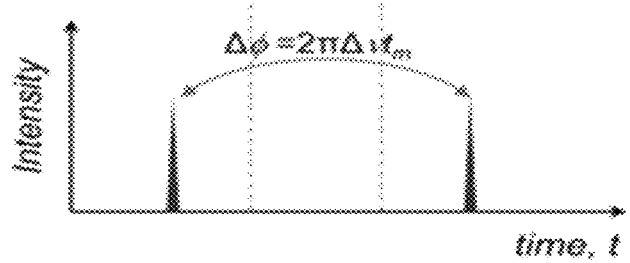
FIG. 2D is a plot of the output pulses of the secondary laser.

When a small perturbation is applied to the driving signal, the optical frequency shifts by an amount Δυ, changing the course of the phase evolution. When the perturbation is switched off, the frequency is restored to the initial value $v_0$. This perturbation will create a phase difference:

$$\Delta\phi=2\pi\Delta v t_m$$

where $t_m$ is the duration of the perturbation. Through optical injection, this phase difference is transferred onto a pair of secondary pulses emitted by the pulse-generation laser as shown in FIG. 2D.

The perturbation signal here is an electrical voltage modulation applied to the phase-preparation laser. The optical frequency change arises from the effect of the carrier density on the refractive index in the laser active medium within the primary laser diode 101. The laser cavity confinement allows the light field to oscillate back and forth within the cavity and experience the refractive-index change for the entire duration of the perturbation. The enhancement due to the laser cavity makes it possible to keep the phase modulation half-wave voltage below 1 V, as we demonstrate later. This cavity feature is absent in conventional phase modulators, where the light makes just a single pass across the electro-optic medium, thus limiting the interaction distance to the device length.

Small changes to the master light source's electric controller signal (of less than 1 volt—much less than required by a conventional lithium niobite phase modulator) can yield transient changes to the output frequency of the master light source's output, which then change the output phase of the secondary laser's optical output.

In this embodiment, the primary laser 101 is configured output a sequence of light pulses comprises a sequence of pairs. The phase of the pulses output by the primary laser is controlled so that the phase between pulses in the same pair is randomly selected from one of a set of phase differences and there is a random phase difference between pulses from different pairs. In an embodiment, the set of phase differences may be selected from one of 0, $\pi/2$, $-\pi/2$ and $\pi$.

The secondary laser 103 that is seeded by the primary laser will output a sequence of pairs of pulses having the same phase differences as the sequence of pulses output by the primary laser 101.

Pulsed injection seeding occurs each time the secondary laser 103 is switched above the lasing threshold. In this case, the generated slave light pulse has a fixed phase relation to the injected master light pulse. As only one slave light pulse is generated for each injected master light pulse, the phase relationship between the pulses output by the secondary laser is the same as the relationship between the pulses injected into the secondary laser.

Under the operating conditions that will be described below in relation to FIG. 3, the secondary laser 103 generates a new sequence of pulses, which comprise a sequence of pairs. The phase between pulses in the same pair is randomly selected from one of a set of phase differences and there is a random phase difference between pulses from different pairs. These pulses will also have a smaller time jitter $\tau' < \tau$ to the pulses outputted by the primary laser 101. The reduced jitter time this improves interference visibility due to the low time jitter of the secondary light pulses.

In order for pulsed injection seeding to occur, the frequency of the light pulses from the primary laser 101 must match the frequency of the secondary laser 103 to within a certain range. In one embodiment, the difference in the frequency of the light supplied by the primary laser 101 and the frequency of the secondary laser 103 is less than 30 GHz. In some embodiments, where the secondary laser 103 is a distributed feedback (DFB) laser diode the frequency difference is less than 100 GHz.

For successful pulsed injection seeding the relative power of the primary laser 101 output light pulses that enter the optical cavity of the secondary laser 103 has to be within certain limits which depend on the type of light source that is used. In one embodiment, the optical power of the injected light pulses is at least 1000 times lower than the optical output power of the secondary laser 103. In one embodiment, the optical power of the injected light pulses is at least 100 times lower than the optical output power of the secondary laser 103.

In one embodiment, secondary laser 103 and primary laser 101 are electrically driven, gain-switched semiconductor laser diodes. In one embodiment, the slave light source and master light source have the same bandwidth. In one embodiment, both light sources have a bandwidth of 10 GHz. In one embodiment, both light sources have a bandwidth of 2.5 GHz. Here, the bandwidth means the highest bit rate achievable with the gain-switched laser diode under direct modulation. A laser of a certain bandwidth can be operated at a lower clock rate.

Figure 3A:
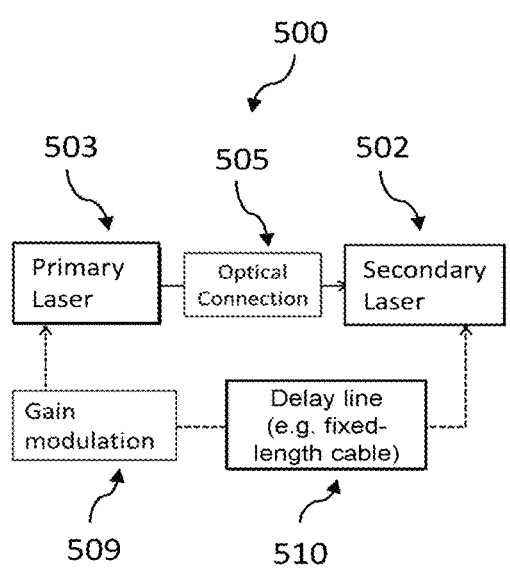
FIG. 3A is a schematic of a gain modulation circuit for driving a primary laser and a secondary laser and FIG. 3B is a series of five time dependent plots which are, in order from the upper most plot: modulation of primary laser; carrier density of primary laser; output of primary laser; modulation of secondary laser; and output of secondary laser.

FIG. 3A is a schematic illustration of a driving scheme for the phase-randomised light source 500 for which both the primary laser 503 and the secondary laser 502 are driven with a single gain modulation unit 509. The gain modulation unit 509 and delay line 510 are an example of a controller which is configured to apply a time varying drive signal to the secondary laser 502 such that just one light pulse is generated during each period of time for which a light pulse is received. The primary laser 503 is connected to the secondary laser 502 via an optical connection 505. The optical connection 505 could be a waveguide, for example an optical fibre. Alternatively, the light pulses may travel between the primary laser 503 and the secondary laser 502 through free space. The optical connection may include further components such as an optical circulator or a beam splitter as provided in the arrangement of FIG. 2A.

A gain modulation unit 509 drives both the primary laser 503 and the secondary laser 502 to generate pulses of light. The delay line 510 is used to synchronise the apparatus. The delay line may be, for example, a fixed length cable. The gain modulation unit is directly connected to the primary laser 503. For example, where the primary laser 503 is a semiconductor laser, a gain modulation circuit is electrically connected to the primary laser 503. The gain modulation unit 509 is connected to the secondary laser 502 through delay line 510.

Figure 3B:
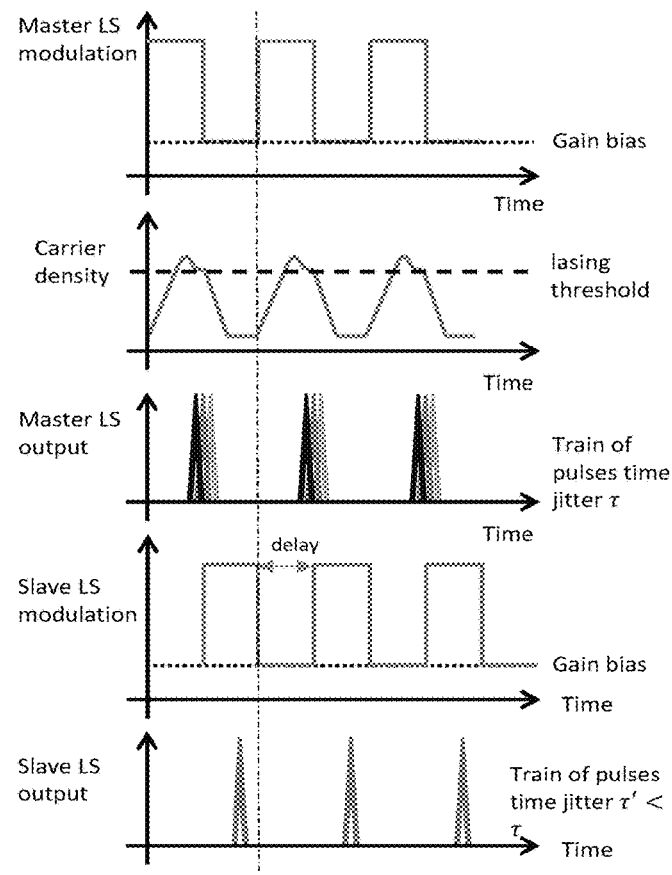

FIG. 3B shows a temporal sequence for the single gain modulation scheme shown in FIG. 3A. The upper graph shows the gain modulation applied to the primary light source 503. The current applied to the laser is shown on the vertical axis, with time on the horizontal axis. The gain modulation is a time varying drive signal, having the form of a square wave, which when applied to the master light source, increases the carrier density above and below the lasing threshold. In other words, the gain modulation is a series of pulses. In between the pulses, the gain has a minimum value, which is the gain bias and is indicated by the dotted line. The wave in this case is a square-type waveform. A different gain modulation signal can be used, for example a sine wave, or a non-periodic time varying signal. In this case, the current is not reduced to zero in between the current modulation pulses, but only reduced to a bias value (which is indicated by the dotted line).

The current modulation signal is applied to the laser and switches the gain of the laser above and below the lasing threshold periodically. The second graph shows the carrier density of the laser on the vertical axis, against time on the horizontal axis. The lasing threshold is indicated by a dashed horizontal line. When a current modulation pulse is applied to the laser, the injected carriers increase the carrier density and the photon density increases.

The laser output generated by the modulation signal is shown in the lower graph. The vertical axis shows the laser intensity, with time on the horizontal axis. The laser outputs light when the carrier density is above the lasing threshold. Photons generated by spontaneous emission inside the laser cavity are amplified sufficiently by stimulated emission to generate an output signal. The length of the delay between the application of the current modulation pulse and the generation of the output light depends on several parameters, such as the laser type, cavity length and pumping power.

The rapid increase of the photon density causes a decrease in the carrier density. This in turn decreases the photon density, which increases the carrier density. At this point the current modulation pulse is timed to switch back down to the DC bias level, and the laser emission dies off quickly. The laser output therefore consists of a train of short laser pulses as shown in the lower graph.

To generate longer pulses, the gain bias is chosen to be closer to the lasing threshold. This means that the carrier density crosses the lasing threshold earlier, which gives the light pulse more time to evolve. Initially the light intensity will overshoot and quickly reduce the carrier density. This in turn causes the photon density to decrease and the carrier density to increase, in turn increasing the light intensity. This competing process causes oscillations of the light intensity at the beginning of the pulse which are strongly damped, leading quickly to a steady-state where the intensity is constant. The oscillations are called relaxation oscillations. The laser pulse ends when the current pulse ends and switches the current to the bias value again.

The next graph shows the output of the primary laser 503. One light pulse is outputted each time the carrier density increases above the lasing threshold. As explained above, there can be a delay between when the gain increases and when a light pulse is outputted. The light pulses output from the master laser have a large time jitter r.

The next graph shows the gain modulation applied to the secondary laser 502. The gain modulation is the same as that applied to the primary laser 503, with the addition of the time delay labelled by an arrow. The gain modulation is a time varying drive signal applied to the secondary laser. In other words, the gain modulation applied to the secondary laser. 502 is shifted in time with respect to the gain modulation applied to the primary laser 503. Each periodic increase in gain is applied to the secondary laser 502 later than it is applied to the primary laser 503. The delay in this case is around half a period of the gain modulation signal. The delay means that the periodic increase in gain is applied to the secondary laser 502 after the light pulse has been injected. Therefore the light pulse from the primary laser 503 is present in the laser cavity of the secondary laser when the gain increase is applied, and the resulting secondary laser 502 generating a light pulse by stimulated emission from the master light pulse. This means that the generated light pulses from the secondary laser have a fixed phase relation to the light pulses injected into the secondary laser from the primary laser.

The secondary laser 502 is switched above the lasing threshold after a light pulse from the primary laser has been injected such that a pulse from the secondary laser is initiated by stimulated emission caused by the injected light pulse. The timing of the onset of the gain bias of the secondary laser 502 is controlled via the delay line 510. The final graph shows the output of the secondary laser 502. Only one light pulse is outputted each time the carrier density increases above the lasing threshold. Again, there can be a delay between the increase in gain modulation and the outputted light pulse. The time jitter of the outputted light pulses from the secondary laser is lower than that of the jitter of the light pulses from the primary laser.

In the system shown in FIG. 3A, the gain modulation unit 509 applies a time varying gain modulation to the secondary light source 502 such that it is switched above the lasing threshold only once during the time that each light pulse from the primary laser is incident. The switching of the secondary laser 502 is synchronised with the arrival of the light pulses from the primary laser because the same gain modulation signal is applied to both light sources, and a delay line delays the application of the increase in gain to the secondary laser 502 with respect to the primary laser 503.

In the system shown in FIG. 3B the time varying gain modulation signal has a square type wave form. However, the time varying gain modulation can comprise signals with arbitrary pulse shape.

Where the light sources are gain-switched semiconductor lasers, the gain modulation signal is an applied current or voltage. In one embodiment, the gain modulation signal is an applied current or voltage with a square type wave form. In an alternative embodiment, the time varying current or voltage is an electrical sine wave generated by a frequency synthesizer. In one embodiment, the frequency of the gain modulation signal is less than or equal to 4 GHz. In one embodiment, the frequency is 2.5 GHz. In one embodiment, the frequency is 2 GHz.

A gain-switched semiconductor laser has a good extinction ratio between the state when pulses are emitted and the "off" state. It can be used to generate very short pulses. In one embodiment, the duration of each of the pulses output from the secondary laser is less than 200 ps. In one embodiment, the duration of each of the pulses output from the secondary laser is less than 50 ps. In one embodiment, the duration of each of the pulses output from the secondary laser is of the order of a few picoseconds. In one embodiment, where the time varying current or voltage is a square wave current or voltage with a frequency of 2 GHz, the short light pulses are 500 ps apart.

In the light source shown in these figures, the primary laser and the secondary laser share the same electrical driver for gain modulation. However, the primary laser and the secondary laser could also be driven by separate gain modulation units 509. By driving the gain modulation by separate units, it is possible to generate longer light pulses output from the primary laser than those shown in FIG. 3B as the gain bias value is closer to the lasing threshold. This means that the carrier density crosses the lasing threshold earlier, which gives the light pulse more time to evolve. This can also be used to reduce jitter.

FIG. 4 relates a further embodiment which uses the source described with reference to FIGS. 2 and 3 in combination with the system of FIG. 1A.

The system of FIG. 4A comprises a primary laser 301 which is controlled as explained with reference FIGS. 2A to 2D to output a sequence of pulses comprising pairs of pulses. The phase between pulses in the same pair is randomly selected from one of a set of phase differences and there is a random phase difference between pulses from different pairs. The primary laser 301 will be provide with a controller (not shown) that controls the gain applied to the laser.

This sequence of pulses output from primary laser 3 or one all have the same polarisation, which in the reference frame of FIG. 4A is defined as a horizontal polarisation. The sequence of pulses is then inputted into secondary laser 303 to seed the secondary laser 3 or 3. This allows the secondary laser to output the first sequence of pulses shown in FIG. 4B. This first sequence of pulses is identical to the first sequence of pulses described with reference to FIG. 1B. The secondary laser will also be provided with a controller (not shown) to control the gain of the laser as explained above.

The remainder of the system is then identical to the system described with reference to FIG. 1A. Therefore, to avoid any necessary unnecessary repetition, like reference numerals will be used to denote like features.

The output pulse sequences shown in FIG. 4C. In the system of FIG. 4A, a quarter wave plate is provided to change the polarisation axis into the desired basis. For example, adding a quarter wave-plate component at the output, oriented at 45 degrees, will convert basis vectors in the circular basis (L/R) to the rectilinear basis (H/V), while leaving the diagonal basis (D/A) vectors unchanged.

At the output of the polarising beam splitter 11, the quarter wave plate 13 rotates the polarisation state of each of the output pulses of the sequence.

In the apparatus of FIG. 4, it is important to note that the output sequence shown in FIG. 4C is obtained by control of the primary laser 301. Controlling the phase of the output pulses from the primary laser using the method described with reference to FIGS. 2A and 2B allows the pulse sequence of FIG. 4C to be obtained without the need to employ components such as phase or polarisation modulators.

The use of the directly modulated gain-switched injection-locked laser source allows a highly compact source of pulses encoded in polarisation to be produced.

FIG. 5A shows a further variation on the system of FIG. 4A where the design is implemented using fibre optics. However, it should be noted that the system of FIG. 1A or FIG. 4A could be also produced in free space or with integrated photonics (i.e. on chip).

As explained with reference to FIG. 4A, the source of the first sequence of pulses is provided by injection locking a secondary laser 303 to a gain switched primary laser 301. The output of the primary laser is directed into the secondary laser 303 via a polarisation maintaining fibre 305.

The first pulse sequence (not shown) from the secondary laser 303 is then directed into 50:50 fibre based beam splitter 351 which splits the pulses and directs them along a first fibre 353 and a second fibre 355.

In the second fibre, 355, a delay loop 357 is shown which introduces a delay Δt which functions in the same way as the delay component 9 of FIG. 1A. Both the first fibre 353 and the second fibre 355 are polarisation maintaining fibres and the polarisation direction of the pulses is aligned with the birefringent axes of the fibre 361, 363 as shown in FIG. 5A.

The first 353 and second 355 fibres are then combined at polarising beam combiner 365. The polarising beam combiner takes one input from each of the first or second fibres 353, 355 and combines these only a single output fibre, where light from the two inputs is placed on two orthogonal polarisation axes (i.e. along the two birefringent axes of the polarisation maintaining fibre).

The design of FIG. 5A provides an advantage over the design of FIG. 4A as the requirement for polarisation rotation (from H to V) within one arm of the interferometer using a half-wave plate 7 can be relaxed by using a polarisation-maintaining fibre polarisation beam combiner (PBC) 365 in place of the PBS. Fibre PBCs are low-cost standard components, available off-the-shelf, which can combine polarised light on the slow axis of two input fibres into orthogonal axes of the output fibre 367. The two polarisation components are shown in the cross section 369 of output fibre 367.

Finally a quarter wave plate, 371 is provided to rotate the output to the desired basis. The quarter waveplate is a fixed component that provides the same transformation to each polarisation state that it encounters. The output sequence in shown in FIG. 5B.

FIG. 6A shows a further variation on the system of FIG. 4A.

In this arrangement, primary laser 701 outputs horizontally polarised light towards 50:50 beamsplitter 703. Beamsplitter 703 then divides the received pulses between a first path 705 and a second path 707.

First secondary laser 709 is provided in the first path 705 and second secondary laser 711 is provided in the second path 707. Thus, in this arrangement, there is a primary laser 701, but this time a pair of Slave Lasers within the two arms of the interference system.

In an embodiment, the primary laser 701 is driven in exactly the same manner as described with reference to FIG. 1A and FIG. 4A, however, the first secondary laser 709 is driven electronically so that it only pulses in the 'late' time bin slot of the clock rate. The pulses from first secondary laser 709 then pass through a waveplate 713, rotating the polarisation state to V polarised. The second secondary laser 711 in the second path 707 is driven electronically so that it only pulses in the 'early' time bin slot of the clock rate. The pulses from the second secondary laser 711 (which are H polarised) are then delayed by time delay Δt 715.

The electrical signal to the primary laser 701 is modulated slightly between the early and late time bin periods, imparting a controlled phase shift Φ on the pulse from second secondary laser 711 compared to the pulse from first secondary laser 709. Pulses from both interferometer arms arrive at a PBS 717 at the same time and the output from the PBS is therefore:

$$\text{Output} = \frac{1}{\sqrt{2}} \begin{pmatrix} 1 \\ e^{j\Phi} \end{pmatrix}$$

As explained in relation to FIG. 1, this enables the polarisation state to be adjusted by simply changing the phase modulation applied to second secondary laser 711 by the primary laser 701 modulation. The output may be further rotated using quarter waveplate 719.

As above, this setup could be further simplified in a fibre-optic configuration by using a polarisation beam combiner made of polarisation-maintaining fibre instead of the half-wave plate and PBS.

The above arrangement allows removal of the polarisation-randomised pulses which occupy every other pulse in the output pulse trains as shown in FIG. 6B. This allows highly flexible polarisation modulation to be achieved without generating additional polarisation-randomised pulses.

The above transmitter can be used in any system where modulation of polarisation is required. One particular use is in quantum key distribution QKD. The proposed transmitters are suitable for use in any QKD system, including point-to-point links and more recent protocol developments such as measurement device independent "MDI" QKD.

Figure 7:
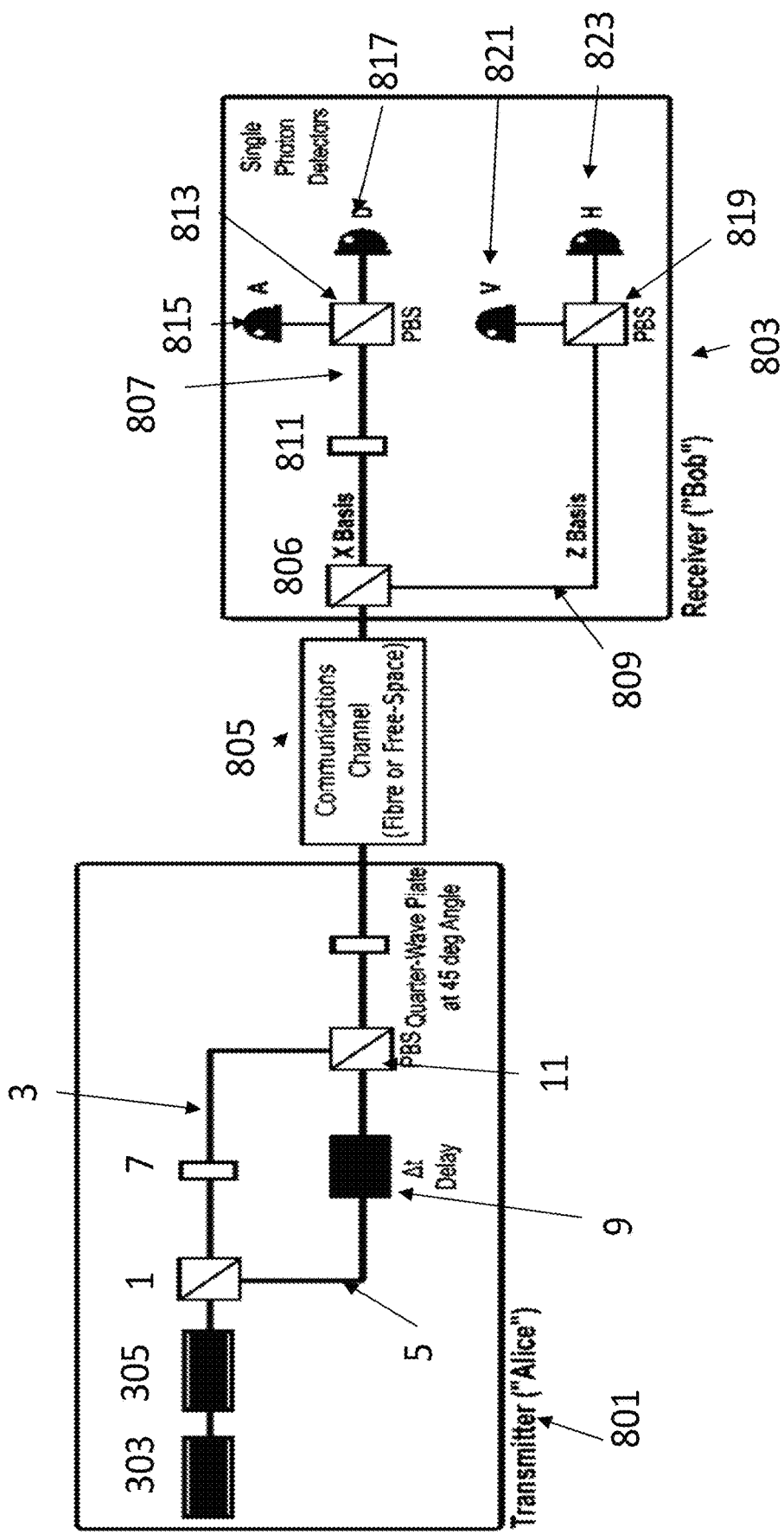
FIG. 7 is a schematic of a quantum communication system in accordance with an embodiment.

FIG. 7 shows a QKD system incorporating the emitter of FIG. 4. However, any of the above emitters could be used in the system.

The QKD system of FIG. 7 comprises a transmitter 801 and a receiver 803. In this embodiment, the transmitter 801 is connected to the receiver 803 via communication channel 805 which can be fibre based, free space or comprise a mix of fibre and free space optics.

The transmitter 801 comprises the emitter of FIG. 4. To avoid any unnecessary repetition, like reference numerals will be used to denote like features with the emitter of FIG. 4.

As explained with reference to FIG. 2, the phase difference between consecutive pulses output by primary laser 303 can be precisely controlled. The pulses with the controlled phase are used to seed secondary laser 305 which, as explained with reference to FIG. 3 outputs pulses with a phase related to that of the seed pulses to produce the input pulse sequence shown in FIG. 4B.

There are many protocols used in QKD, one of the popular protocols is the BB84 protocol. The BB84 protocol will be briefly discussed. However, any QKD protocol that can be executed using polarisation encoding could be used.

The protocol uses two basis wherein each basis is described by two orthogonal states. For this example the basis of H/V and D/A. However, the L/R basis could also be selected.

The sender in the protocol prepares states with one of H, V, D or A polarisation. In other words, the prepared states are selected from two orthogonal states (H and V or D and A) in one of two basis H/V and D/A. This can be thought of as sending a signal of 0 and 1 in one of two basis, for example H=0, V=1 in the H/V basis and D=0, A=1 in the D/A basis. The pulses are attenuated so that they comprise on average, one photon or less. Thus, if a measurement is made on the pulse, the pulse is destroyed. Also, it is not possible to split the pulse. As explained with reference to FIGS. 1 to 4, the primary laser 301, can be controlled to output consecutive pulses with a phase difference selected from one of four phase differences, consecutive pulses with these phase differences are converted to polarisation states with one of the four above states using the emitter of FIG. 2.

For a QKD system, the primary laser 303 can be controlled to randomly select between one of four set phase differences where each set phase difference corresponds to one of the four polarisation states required for the protocol. As mentioned above, the input signal of FIG. 1B or FIG. 4B comprises pairs of pulses. The phase difference between different pairs is randomised. By gain-switching the primary laser, each primary laser pulse (and thus each secondary laser pulse pair) automatically inherits a random phase since (unlike the secondary laser) it is not seeded and thus, light grows from noise (vacuum fluctuations) which is inherently phase-random. It is also possible to randomly set the phase difference between pulses of consecutive pairs to an arbitrary value. This is not shown in FIG. 4A, but a gain controller will be provided to control the gain for the primary laser and the secondary laser.

The sequence of output pulses from the transmitter 801 is then passed through free space or via an optical fibre 805 to receiver 803. A simplified form of the receiver is shown. The receiver comprises a 50-50 beam splitter 806 which will direct the incoming pulse either along first measurement channel 807 or a second measurement channel 809. Since the pulses contain on average less than one photon, the 50-50 beam splitter 806 will direct the pulse randomly along one of the first measurement channel or the second measurement channel. This has the result of selecting a measurement basis to be the X (D/A) basis or the Z (H/V) basis. The non-polarising beam splitter 808 functions to allow random selection of one of the two bases.

The first measurement channel is for the X basis which corresponds to the D/A bases. Here, a half wave plate 811 is provided at a 22.5° angle to rotate the polarisation. The output of the half wave plate 811 is then directed towards polarising beam splitter 813. Polarising beam splitter 813 directs pulses with anti-diagonal polarisation towards anti-diagonal detector 815 and pulses with a diagonal polarisation towards diagonal detector 817. Detectors 815 and 817 are single photon detectors, for example avalanche photodiodes.

Pulses directed along the second measurement channel are measured in the Z basis to determine if they are horizontal or vertical. Here, the pulses directed into the second measurement channel are directed toward polarising beam splitter 819 which directs vertically polarised pulses towards detector 821 and horizontally polarised pulses towards detector 823. Again, detectors 821 and 823 are single photon detectors.

If a photon is received which is polarised in the D/A bases and this is randomly sent to be measured in the X bases along the second management channel 809, one of detectors 821, 823 are likely to register a count. However, this result cannot be trusted as a photon received at polarising beam splitter 819 has a 50-50 chance of being directed towards either the vertical or the horizontal detector.

The selection of the measurement basis can be active or passive. In passive selection the basis is selected using fixed components, such as the beam splitter as shown in FIG. 7. In "active" basis choice, the receiver makes a decision which basis to measure in—e.g. using a modulator with an electrical control signal.

In summary, if the basis used to measure the pulse at the receiver is the same as the basis used to encode the pulse, then the receiver's measurement of the pulse is accurate.

However, if the receiver selects the other basis to measure the pulse, then there will be a 50% error in the result measured by the receiver.

To establish a key, the sender and receiver compare the basis that were used to encoder and measure (decode). If they match, the results are kept, if they do not match the results are discarded. The above method is very secure. If an eavesdropped intercepts the pulses and measures then, the eavesdropper must prepare another pulse to send to the receiver. However, the eavesdropper will not know the correct measurement basis and will therefore only has a 50% chance of correct measuring a pulse. Any pulse recreated by the eavesdropper will cause a larger error rate to the receiver which can be used to evidence the presence of an eavesdropper. The sender and receiver compare a small part of the key to determine the error rate and hence the presence of an eavesdropper.

FIG. 7 shows a phase-to-polarisation-based transmitter 801 with a single secondary laser 8-5 deployed in a point-to-point QKD system. As explained in relation to FIG. 4B, the output from this transmitter has every other pulse polarisation randomised. These pulses cannot be used to encode information and the QKD receiver would ignore these when distilling the detector signal to generate a secure quantum key (e.g. by software processing or electronic gating of the detector, both of which techniques are already widely employed in QKD systems). The randomised pulses can still be useful for QKD, however: the receiver could use detection statistics for these pulses to measure the distribution of random polarisation states and thus, infer the quality of phase randomisation between bits, which is an important criterion for the security of QKD.

Alternatively, the transmitter shown in FIG. 6A using 2 secondary lasers could be employed as the transmitter 801 of FIG. 7, which does not have every other pulse being polarisation randomised. Whether this is a desirable feature or not depends on the application—both options could find utility in practice.

The receiver design 803 is not adapted specifically for the transmitter 801 and the receiver can be any receiver which is used for polarisation decoding in QKD.

The above emitter in the QKD system can be implemented using discrete fibre optics, free-space optics or on-chip.

FIG. 7 shows a basic system. However, the design could be modified with additional components to add additional features (using current technological approaches for these) such as decoy states which are used in practical QKD communication systems.

In the above system, the wavelength of each of the pulses with different polarisations are identical since they all come from the same primary laser and hence an eavesdropper is not able to obtain any "side channel" information due to differences in the wavelength of the pulses.

Further, the above QKD system does not need to use phase modulators which add significant cost, complexity and size to polarisation modulated transmitters. $LiNbO_3$ modulators are also not readily adaptable to an integrated photonics platform, which prevents many QKD transmitter designs being developed into small photonic chip-based designs. Also, birefringence of the phase modulator crystals can induce polarisation mode dispersion, which must be compensated by additional components, adding further complexity and cost. Phase modulators typically have half-wave voltages of a few volts. To obtain a $\pi$ phase shift between the polarisation modes when used in non-interferometer arrangement even higher voltages are required. Such high voltages can be impractical to generate and increase power consumption of the overall communications transmitter.

Whilst certain embodiments have been described, these embodiments have been presented by way of example only, and are not intended to limit the scope of the inventions. Indeed, the novel devices, and methods described herein may be embodied in a variety of other forms; furthermore, various omissions, substitutions and changes in the form of the devices, methods and products described herein may be made without departing from the spirit of the inventions. The accompanying claims and their equivalents are intended to cover such forms or modifications as would fall within the scope and spirit of the inventions.

The invention claimed is:

1. An emitter configured to output a sequence of periodic light pulses with different polarisations, the emitter comprising:
    a beam splitter configured to divide the pulses of a first sequence of pulses, such that each pulse is split between a first path and a second path, the first sequence of pulses having a varying phase and a first polarisation;
    a polarisation rotator configured to rotate the polarisation state of pulses in one of the first path or the second path with respect to the polarisation state of pulses in the other path;
    a time delay component configured to provide a time delay such that the first sequence of pulses in the first path are delayed by one period with respect to the first sequence of pulses in the second path;
    an optical combination component configured to combine the delayed first sequence of pulses from the first path with the first sequence of pulses from the second path to produce an output sequence of pulses where each pulse in the output sequence is a combination of a pulse from the second path and a delayed pulse from the first path and has a polarisation determined from the phase difference between combined pulses and the polarisation of the first path and the second path.

2. The emitter of claim 1, the emitter further comprising a first source configured to generate the first sequence of pulses of light having a varying phase and a first polarisation.

3. The emitter of claim 2, further comprising a controller for said first source wherein said controller is configured to cause said first source to output pulses where pairs of pulses have a phase difference that allows one of a set number of phase differences to be randomly selected.

4. The emitter of claim 3, wherein said controller is configured to cause said first source to output pairs of pulses having a set phase difference randomly selected from one of $0$, $\pi/2$, $-\pi/2$ and $\pi$.

5. The emitter of claim 3, wherein the controller is configured to cause said first source to output pairs of pulses with said set phase difference and for a random phase difference to be provided between the last pulse of one pair and the first pulse of the following pair.

6. The emitter of claim 3, wherein the first source is a gain switched laser and said controller is configured to modify the gain applied to the first source.

7. The emitter of claim 6, further comprising at least one further gain switched laser which is configured as a secondary laser and receives a seeding pulse from said first source.

8. The emitter of claim 7, wherein the secondary laser is provided prior to said beam splitter such that the sequence of pulses output by the secondary laser is divided by said beam splitter.

9. The emitter of claim 7, wherein the secondary laser is provided by a first gain switched secondary laser and a second gain switched secondary laser, wherein the first secondary laser is provided in the first path and the second secondary laser is provided in the second path.

10. The emitter of claim 9, wherein a secondary laser controller is provided to control the first secondary laser not to emit a pulse when it receives the second pulse of a pair of pulses with the set phase difference and to control the second secondary laser not to emit a pulse when it receives the first pulse of the pair of pulses with the set phase difference.

11. The emitter of claim 1, wherein the first path and second path comprise polarisation maintaining optical fibre and the polarisation rotator is provided by rotating the fibre birefringent axis in one path.

12. The emitter of claim 1, wherein the optical combination component is a polarising beam splitter.

13. The emitter of claim 1, further comprising a waveplate provided to rotate the polarisation of the output sequence of pulses.

14. The emitter of claim 1, wherein the polarisation rotator is configured to rotate the polarisation state of pulses in one of the first path or the second path with respect to the polarisation state of pulses such that pulses in one path have an orthogonal polarisation to the pulses in the other path.

15. The emitter of claim 1, wherein the emitter is configured to output pulses randomly selected from two polarisation basis.

16. The emitter of claim 15, wherein the emitter is configured to output one of four states, said four states selected from two orthogonal states in each polarisation basis.

17. The emitter of claim 16, wherein the emitter comprises at least one gain switched laser and said four states are selected by randomly switching the gain of the laser between values that allow the output of said four states.

18. A communication system comprising an emitter according to claim 15, and a receiver, said receiver being configured to receive pulses from said emitter and measure said pulses in a first or a second polarisation basis.

19. A method of emitting a sequence of periodic light pulses with different polarisations, the method comprising:
receiving a first sequence of pulses of light having a varying phase and a first polarisation,
dividing the pulses of the first sequence, such that the pulse from each beam is split between a first path and a second path,
rotating the polarisation state of pulses in one of the first path or the second path with respect to the polarisation state of pulses in the other path;
delaying in time the first sequence of pulses in the first path by one period with respect to the first sequence of pulses in the second path;
combining the delayed first sequence of pulses from the first path with the first sequence of pulses from the second path to produce an output sequence of pulses where each pulse in the output sequence is a combination of a pulse from the second path and a delayed pulse from the first path and has a polarisation determined from the phase difference between combined pulses and the polarisation of the first path and the second path.

20. A quantum communication method, the method comprising:
emitting a sequence of periodic light pulses with different polarisations according to the method of claim 19, wherein pulses in the sequence of periodic light pulses with different polarisations, comprise polarisations randomly selected from two polarisation basis; and
receiving at a receiver the sequence of periodic light pulses with different polarisations and varying the polarisation measurement basis in the receiver.

* * * * *